United States Patent
Fujii (10) Patent No.: US 6,450,433 B1
(45) Date of Patent: Sep. 17, 2002

(54) FF/REW CONTROL APPARATUS, FF/REW CONTROL METHOD AND MEDIUM CONTAINING FF/REW CONTROL PROGRAM

(75) Inventor: Noriyuki Fujii, Daito (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 09/569,019

(22) Filed: May 11, 2000

(30) Foreign Application Priority Data

May 19, 1999 (JP) ............................. 11-003416

(51) Int. Cl.[7] ........................... B65H 59/38; G11B 15/46
(52) U.S. Cl. ................. 242/334.4; 242/334.1; 242/334.3
(58) Field of Search ........................ 242/334.4, 334.1, 242/334.3, 412.2, 412.3

(56) References Cited

U.S. PATENT DOCUMENTS 6,227,476 B1 * 5/2001 Morisada ................. 242/334.4

FOREIGN PATENT DOCUMENTS

| JP | 2-27756 | 1/1990 |
|---|---|---|
| JP | 3-052681 | 3/1991 |
| JP | 3-054396 | 3/1991 |
| JP | 3-057185 | 3/1991 |
| JP | 3-057731 | 3/1991 |
| JP | 3-95751 | 4/1991 |
| JP | 3-095751 A | * 4/1991 |
| JP | 4-332989 | 11/1992 |
| JP | 4-332989 A | * 11/1992 |

OTHER PUBLICATIONS

English Translation of JP 03–095751 (Mitsune, Published Apr. 1991).*
English Translation of JP 04–332989 (Hideki, Published Nov. 1992).*

* cited by examiner

Primary Examiner—Donald P. Walsh
Assistant Examiner—Joseph Rodriguez
(74) Attorney, Agent, or Firm—Crowell & Moring LLP (57) ABSTRACT

An FF/REW control apparatus which performs high-speed FF/REW by simple control. Conventionally, if a hub diameter is discriminated, even though a user instructs execution of high-speed FF/REW, an operation mode cannot be immediately shifted to a high-speed FF/REW mode. Further, as a software sequence for hub discrimination is required, a ROM capacity for this purpose is required. The FF/REW control apparatus performs high-speed tape forward control for a thick hub and high-speed tape forward control for a thin hub. A system controller 20 calculates a value N representing the ratio between a rotational period of a take-up reel and that of a supply reel, and if the value N is other than values of a tape having the thick hub, immediately performs the high-speed tape forward control for the thin hub. Thus, the high-speed FF/REW can be quickly performed without direct discrimination of hub diameter, and software for this purpose is not necessary.

13 Claims, 11 Drawing Sheets

For thin habu

| N | N≦1.4 | 1.4<N≦1.6 | 1.6<N≦1.8 | 1.8<N≦2.0 | 2.0<N |
|---|---|---|---|---|---|
| Acceleration ratio | 18 | 15 | 12 | 9 | 6 |
| Deceleration threshold value | 1.8≦N | | 2.0≦N | | |

FIG. 10B

For thick hub

| N | N≦0.7 | 0.7<N≦0.8 | 0.8<N≦0.9 | 0.9<N≦1.0 | 1.0<N |
|---|---|---|---|---|---|
| Acceleration ratio | 18 | 15 | 12 | 9 | 6 |
| Deceleration threshold value | 0.9≦N | | 1.0≦N | | |

X-times acceleration

FF/REW CONTROL APPARATUS, FF/REW CONTROL METHOD AND MEDIUM CONTAINING FF/REW CONTROL PROGRAM

BACKGROUND OF THE INVENTION

1. Field of the Invention

The present invention relates to an FF/REW control apparatus capable of performing high-speed FF/REW, a FF/REW control method and a medium in which an FF/REW control program is recorded.

2. Description of the Prior Art

Conventionally, in this type of FF/REW control apparatus, rotational periods of a video tape supply reel and a take-up reel are detected. Upon high-speed FF (Fast Forward) or high-speed REW (Rewind), a hub diameter is discriminated based on both rotational periods, and a tape running speed is controlled in accordance with the hub diameter. Generally, a VHS (Video Home System)-format video tape has either a hub diameter of 26 mm or 62 mm. If high-speed REW control or the like for a video tape having a hub diameter of 26 mm, (hereinafter referred to as a "thin hub") is performed on a video tape having a hub diameter of 62 mm (hereinafter referred to as a "thick hub"), then the REW operation cannot be stopped at a tape end position, but rather further REW operation occurs. Accordingly, the tape transport speed is controlled in accordance with the hub diameter.

The hub diameter discrimination utilizes the fact that if the rotational periods of the supply reel Ts and take-up reel Tt are substituted into an expression:

$$A=Ts^{}2+Tt^{}2,$$

"A" has a fixed value in accordance with hub diameter. That is,

If 3<A holds, then the hub diameter is 62 mm

If 1.8<A<3 holds, then the hub diameter is 26 mm

Thus, the hub diameter can be discriminated.

In the conventional apparatus, prior to high-speed FF/REW, a normal FF/REW is performed for several seconds, in order to detect the rotational periods of the supply reel and the take-up reel. Then, the above value A is obtained based on the detected values. The acceleration and deceleration upon high-speed FF/REW are then controlled in accordance with the hub diameter discriminated from the calculation.

On the other hand, Japanese Published Unexamined Patent Application No. Hei 3-95751 discloses performing the normal FF/REW for several seconds to detect the rotational speeds of the supply reel and the take-up reel prior to the high-speed FF/REW, and then calculating a ratio N between the rotational speeds. When the ratio N falls within a predetermined value range, a change rate is calculated based on the change of the ratio N over time. Utilizing the fact that the change rate of the ratio N differs for the case where the hub is out of specification and for the case where the hub is a thick hub, it is discriminated whether the hub is a thick hub or a hub out of specification (hereinafter referred to as an "out-of-spec hub"). The high-speed FF/REW is performed in accordance with the result of the discrimination. Further, deceleration is performed when the ratio N is either a predetermined or greater value or when the ratio N is a reciprocal of its initial value. Then, the FF/REW is terminated.

The above-described conventional FF/REW control apparatuses have the following problems.

In the former apparatus (where the hub diameter is discriminated by performing normal FF/REW for several seconds prior to high-speed FF/REW and control is performed in accordance with the hub diameter), when a user requests execution of high-speed FF/REW, the operating mode cannot be quickly shifted to the high-speed FF/REW mode. Further, because a software sequence is required to perform the hub diameter discrimination, a ROM capacity for this purpose is required.

On the other hand, in the latter apparatus, the rotational periods of the supply reel and the take-up reel are detected by performing normal FF/REW for several seconds prior to high-speed FF/REW, and the high-speed FF/REW is controlled in accordance with the ratio between these rotational speeds. In this control, since the rotational period ratio N is discriminated every time before high-speed FF/REW is performed, there is a possibility that in controlling a thin hub video tape, if FF/REW has been stopped once and is then performed again, thick hub control may be performed on the video tape.

Further, in this apparatus, in order to perform control in accordance with the respective hub diameters, the discrimination of the ratio N, the detection of time change of the ratio N, and the discrimination of whether or not the value of the ratio N is a reciprocal of its initial value, are made. Accordingly, in constructing this type of high-speed FF/REW apparatus, the processing load imposed by the software is heavy, and the necessary ROM capacity is large.

SUMMARY OF THE INVENTION

The present invention has been made in consideration of the above problems, and has as its objects to provide: a FF/REW control apparatus capable of performing high-speed tape forward (high-speed FF/REW) by a simple control, a FF/REW control method, and a medium in which a FF/REW control program is recorded.

According to the present invention, the foregoing objects are attained by providing a FF/REW (Fast Forward/Rewind) control apparatus comprising: a speed-variable tape forward mechanism, in which a video tape is loaded, for performing FF (Fast Forward) or REW (Rewind) control while variably controlling a tape running speed; a reel rotational-period detection unit for detecting rotational periods of a supply reel and a take-up reel of the video tape loaded in the speed-variable tape forward mechanism; a rotational-period-ratio calculation unit for calculating a rotational period ratio between the rotational periods of the supply reel and the take-up reel detected by the reel rotational-period detection unit; and a tape-forward control unit, capable of performing high-speed tape forward for the case where a hub diameter of the video tape is a thick hub diameter and for the case where the hub diameter is a thin hub diameter by controlling the speed-variable tape forward mechanism. The tape-forward control unit performs, upon FF/REW operation request, high-speed tape forward control for the case where the hub diameter is the thin hub diameter when the rotational period ratio calculated by the rotational-period-ratio calculation unit has a value other than values predetermined for the case where the video tape has the thick hub diameter.

In accordance with the present invention constructed as described above, when a video tape is loaded into the speed-variable tape forward mechanism and tape forward is requested, the reel rotational-period detection unit detects the rotational periods of a supply reel and a take-up reel of the video tape, and the rotational-period-ratio calculation unit calculates the rotational period ratio between the rotational periods of the supply reel and the take-up reel. Further, the tape-forward control unit is capable of performing high-speed tape forward for the case where the hub diameter of the video tape is the thick hub diameter and for the case where the hub diameter of the video tape is the thin hub diameter, by controlling the speed-variable tape forward mechanism. When FF/REW is performed in the FF/REW control apparatus, the rotational-period-ratio calculation unit calculates the rotational period ratio. If the rotational period ratio has a value other than values for a video tape having the thick hub diameter, the tape-forward control unit performs the high-speed tape forward control for the case where the hub diameter is the thin hub diameter.

In other words, the value range of the rotational period ratio of a video tape having the thick hub diameter overlaps with that of the rotational period ratio of a video tape having the thin hub diameter. Generally, as the amount of tape having the thick hub diameter is larger than that of a tape having the thin hub diameter, if the video tape having the thick hub diameter is subjected to the same control as the control for the video tape having the thin hub diameter, then even when a forward/rewind position approaches the tape end position, deceleration is not performed and stoppage in an appropriate position is not made. Accordingly, in order to avoid any inconvenience by performing the thin hub video tape control on the video tape having the thick hub diameter, the control for the video tape having the thin hub diameter is performed only if it is determined by the detected rotational period ratio that the video tape cannot be a tape having the thick hub diameter, and thereafter, the control for the tape having the thin hub diameter is performed until the video tape is ejected.

As described above, in the present invention, as the high-speed tape forward control is performed in accordance with the rotational period ratio between the supply reel and the take-up reel, even though hub diameter discrimination is not necessary, the same advantage as that obtained by hub diameter discrimination can be obtained as the FF/REW progresses. Accordingly, a FF/REW control apparatus capable of performing high-speed tape forward in a simple manner can be provided.

In this manner, in the present invention, as the hub diameter is not directly discriminated (but rather the ratio between the rotational periods of the supply reel and the take-up reel is discriminated), a high-speed tape forward mode is executed immediately after the request for high-speed tape forward. Further, even though the hub diameter is not known immediately after starting high-speed tape forward, the hub diameter of the loaded video tape is discriminated as the FF/REW progresses, hence appropriate control can be performed on video tapes having respective hub diameters.

As described above, the VHS-format video tapes include tapes having a hub diameter of 62 mm and tapes having a hub diameter of 26 mm. The former corresponds to a thick hub and the latter, a thin hub. Further, in FF and REW, the only difference is that the tape forward directions are opposite to each other. Accordingly, for the case where the above rotational period ratio is Tt/Ts (Tt being the rotational period of the take-up reel, and Ts being the rotational period of the supply reel) in FF, and the rotational period ratio is Ts/Tt in REW, since it is preferable that the value increases as time elapses in both FF and REW, the threshold values used to control the acceleration and deceleration can be the same.

The VHS-format video tapes include thick-hub tapes and thin-hub tapes, and further, video tapes having hub diameters out of the above specification. Accordingly, it is preferable to avoid any inconvenience even if such out-of-spec hub diameter video tapes are used. As an example of such a construction, according to another aspect of the present invention, in the FF/REW control apparatus, the tape-forward control unit performs thick hub diameter high-speed tape forward control when the rotational period ratio has a value other than the values for a video tape having an out-of-spec hub diameter.

In the present invention as constructed above, if the rotational period ratio has a value other than values of the video tape having the out-of-spec hub diameter, the high-speed tape forward control for a thick hub is performed. That is, the value ranges of the rotational period ratio of video tapes having thick and thin hub diameters overlap with that of the rotational period ratio of video tapes having out-of-spec hub diameter, and generally, the value rage of video tape having the out-of-spec hub diameter is within the value range of the video tape having the thick and thin hub diameters. Accordingly, to avoid inconvenience caused by performing control for video tapes having the thick and thin hub diameters on a video tape having the out-of-spec hub diameter, the control for a thick hub is performed only if it is determined by the detected rotation ratio that the video tape is not out of specification. If it is further determined that the hub is not a thick hub, then control for a thin hub is performed.

Accordingly, the present invention can be applied to a case where a video tape having an out-of-spec hub diameter is loaded.

Note that as described above, generally, the rotational period ratios of the video tape having the out-of-spec hub diameter, the video tape having the thick hub diameter, and the video tape having the thin hub diameter overlap with each other. According to another aspect of the present invention, as a particular example of these rotational period ratio value ranges, in the FF/REW control apparatus, the tape-forward control unit determines that the rotational period ratio has a value other than the values of the video tape having the out-of-spec hub diameter if the rotational period ratio is out of a range of 0.8 to 1.2, and determines that the rotational period ratio has a value other than the values of the video tape having the thick hub diameter if the rotational period ratio is out of a range of 0.6 to 1.7.

In the present invention constructed as above, the possible value range of the rotational period ratio of a video tape having the out-of-spec hub diameter is 0.8 to 1.2, that of a video tape having the thick hub diameter is 0.6 to 1.7, and a range beyond these ranges is a value range of a video tape having the thin hub diameter, that is, generally the value of the rotational period ratio is within a range of about 0.3 to 3.3. In the case of a thin hub, the rotational period ratio has any value within the entire range; in the case of a thick hub, the rotational period ratio is from 0.6 to 1.7; and in the case of an out-of-spec hub, a value ranges from 0.8 to 1.2. The above-described control is performed with these ranges as respective value ranges.

Accordingly, control can be performed in accordance with the respective hub diameters by discrimination of the rotational period ratio.

Note that upon high-speed tape forward, various constructions may be made as long as it can forward the tape at a speed higher than a normal speed. Accordingly, as one example of such a construction, according to another aspect of the present invention, in the FF/REW control apparatus the tape-forward control unit controls the high-speed forward so as to accelerate a tape running speed to a higher speed as an initial value of the rotational period ratio becomes smaller in the case where the hub diameter is the thick hub and in the case where the hub diameter is the thin hub. When the rotational period ratio is greater than a predetermined value, the tape-forward control unit decelerates the tape running speed.

In the present invention constructed as above, in high-speed tape forward in case of thick hub and in high-speed tape forward in case of thin hub, the tape-forward control unit controls the tape forward such that as the initial value of the rotational period ratio gets smaller, the tape forward is accelerated to a higher speed, and when the rotational period ratio is equal to or greater than the predetermined value, the tape forward is decelerated. That is, in a video tape, the smaller the rotational period ratio, the smaller the amount of tape wound on a reel on the tape-forwarded side. Conversely, the larger the rotational period ratio, the greater the amount of tape wound on a reel on the tape-forwarded side. Accordingly, as the initial value of the rotational period ratio becomes smaller, the FF/REW is accelerated to a higher speed. Further, to prevent the FF/REW from passing a tape end position while performing high-speed FF/REW, the high-speed FF/REW is decelerated when the rotational period ratio becomes greater than the predetermined value.

Accordingly, high-speed tape forward control can be performed with simple discrimination in accordance with the amount of remaining tape.

More specifically, when controlling for a thick hub, the rotational period ratio is divided into 5 ranges, i.e., less than 0.7, as an initial value, then 0.7 to 0.8, then 0.8 to 0.9, then 0.9 to 1.0, and then greater than 1.0. When the rotational period ratio is less than 0.7, the high-speed tape forward is accelerated 18 times its higher speed; when the ratio is 0.7 to 0.8, the high-speed tape forward is accelerated 15 times its higher speed; when the ratio is 0.8 to 0.9, the high-speed tape forward is accelerated 12 times its higher speed; when the ratio is 0.9 to 1.0, the high-speed tape forward is accelerated to 9 times its speed; and when the ratio is greater than 1.0, the high-speed tape forward is accelerated to a sextuple speed. In a case where the initial value of the rotational period ratio is less than 0.8, the high-speed tape forward is decelerated to the sextuple speed when the rotational period ratio becomes greater than 0.9; in a case where the initial value of the rotational period ratio becomes greater than 0.8, the high-speed tape forward is decelerated to the sextuple speed when the rotational period ratio is greater than 1.0.

Further, in the above-described control for a thin hub tape, the possible value range for the thin hub is divided into 5 ranges, and a target accelerated speed is determined based on the range to which the initial value of the rotational period ratio belongs. Then, deceleration is started when the rotational period ratio goes over a predetermined value. As a result, the smaller the initial value of the rotational period ratio, i.e., the larger the forwardable amount of remaining tape, the tape forward is accelerated to a higher speed, then the tape forward is decelerated when the forwardable amount of tape becomes less than a predetermined amount. Thus, high-speed tape forward is performed in accordance with the forwardable amount of tape.

In this manner, in the above-described present invention, since high-speed tape forward can be performed without directly discriminating the hub diameter, the operating mode can be moved to a high-speed tape forward mode immediately after starting FF/REW. As a more particular example of such construction, according to another aspect of the present invention, in the FF/REW control apparatus, the tape-forward control unit quickly performs high-speed tape forward control in accordance with the rotational period ratio calculated by the rotational-period-ratio calculation unit immediately after starting FF/REW.

In the present invention constructed as above, the tape-forward control unit immediately performs the high-speed tape forward control for the above-described thick hub and thin hub (or control for out-of-spec hub), in accordance with the ratio between the rotational periods of the supply reel and the take-up reel detected immediately after the start of FF/REW. Accordingly, the operating mode can be moved to the high-speed tape forward mode immediately after the start of FF/REW.

Accordingly, the high-speed tape forward can be performed immediately after the start of FF/REW.

According to another aspect of the present invention, a FF/REW control apparatus is provided comprising: a supply reel and a take-up reel, provided in a position where a video tape is loaded and being rotatable while engaging with hubs of the video tape; a reel motor, connectable via an idler to one of the supply reel and the take-up reel and being capable of speed-variably driving any one of the reels in a predetermined direction; rotational period sensors that respectively detect rotational speeds of the supply reel and the take-up reel; end sensors that respectively detect a start end and a terminal end in the video tape; and a system controller, connected to the rotational period sensors, the end sensors and the reel motor, that calculates a rotational period ratio between the rotational speeds of the supply reel and the take-up reel based on the result of outputs from the rotational period sensors when high-speed tape forward is performed on the video tape until the start end or the terminal end is detected by the end sensors, and performs high-speed tape forward control for a thick hub if the rotational period ratio has a value within a value range of a video tape having a thick hub diameter, while performing high-speed tape forward control for a thin hub if the rotational period ratio has a value outside of the value range of the video tape having the thick hub diameter.

In the present invention constructed as above, when a video tape is loaded, the supply reel and the take-up reel engage with hubs of the video tape and become rotatable. The reel motor is connected via the idler to one of the supply reel and the take-up reel and enters a status possible to drive with a variable speed the tape in the predetermined direction. on the other hand, the end sensors are provided to detect the start end and the terminal end of the video tape. The system controller performs the high-speed tape forward on the video tape until the start end or terminal end is detected by the end sensors. At this time, the system controller calculates the rotational period ratio between the rotational periods of the supply reel and the take-up reel based on the result of outputs from the rotational period sensors. If the rotational period ratio has a value within the range of a video tape having the thick hub diameter, the system controller performs the high-speed tape forward control for a thick hub, and when the rotational period ratio has a value outside of the range of the video tape having the thick hub diameter, it performs the high-speed tape forward control for a thin hub.

In this manner, it can be understood that the high-speed tape forward control in accordance with the rotational period ratio between the supply reel and take-up reel is not limited to a device having a material substance, but realized as a method. According to another aspect of the present invention, a FF/REW control method is provided for performing, upon execution of FF or REW while varying a tape running speed of a loaded video tape, high-speed tape forward in a case where a hub diameter of the video tape is a thick hub diameter and high-speed tape forward in a case where the hub diameter is a thin hub diameter, comprising the steps of: detecting rotational periods of a supply reel and a take-up reel of the video tape; calculating a rotational period ratio between the detected rotational periods of the supply reel and the take-up reel; and performing high-speed tape forward control in the case where the hub diameter is the thick hub diameter if the calculated rotational period ratio has a value within a value range of a video tape having the thick hub diameter, while performing high-speed tape forward control for a thin hub diameter if the rotational period ratio has a value outside of the value range of the video tape having the thick diameter.

That is, the present invention is applicable to not only a medium having a material substance but also a method.

The FF/REW control apparatus may be implemented as a single apparatus, or may be utilized in a status where it is incorporated into another apparatus. Thus, the idea of the invention is not limited to the apparatus having the above construction, but includes various aspects such as hardware and software and may be arbitrarily changed.

Further, in a case where the present invention is implemented by software for the FF/REW control apparatus as a particularly implemented example of the idea of the invention, the invention exists and can be utilized on a medium containing such software.

As an example, according to another aspect of the present invention, a medium is provided in which a FF/REW control program to be performed by a computer is stored. Upon requesting FF or REW while varying a tape running speed of a loaded video tape, high-speed tape forward is performed in a case where a hub diameter of the video tape is a thick hub diameter and in a case where the hub diameter is a thin hub diameter. The program comprises: detection process procedure code for detecting rotational periods of a supply reel and a take-up reel of the video tape; calculation process procedure code for calculating a rotational period ratio between the detected rotational periods of the supply reel and the take-up reel; and control process procedure code for performing high-speed tape forward control in the case where the hub diameter is the thick hub diameter if the calculated rotational period ratio has a value within a value range of a video tape having the thick hub diameter, while performing high-speed tape forward control in the case where the hub diameter is the thin hub diameter if the rotational period ratio has a value outside of the value range of the video tape having the thick diameter.

The medium may be a magnetic recording medium or an opto-magnetic recording medium, or further, may be any recording medium to be developed in the future. Further, duplicates including primary and secondary duplicates can be considered to be equivalent to the above recording medium. Further, the present invention can be applied to a case where the invention is supplied via a communication line.

Further, the idea of the invention does not change at all when the invention is realized in part by software and in part by hardware. Further, the present invention is applicable to a case where a part of the invention is stored in a recording medium and it is arbitrarily read as necessary.

In this manner, to realize the present invention by software, hardware and an operating system may be utilized, or the present invention may be realized separately from the hardware and operating system. For example, the processing may be performed by reading a predetermined function in the operating system, or may be performed by inputting such function from the hardware. Even in a case where the invention may be actually realized via the operating system, it can be understood that in the progress of recording the program into the medium to be delivered to users, the present invention can be implemented only by the program.

Further, in a case where the present invention is implemented by software, the invention is realized as a medium containing a program. Further, the present invention is realized as the program itself. The program itself is included in the present invention.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

Figure 1:
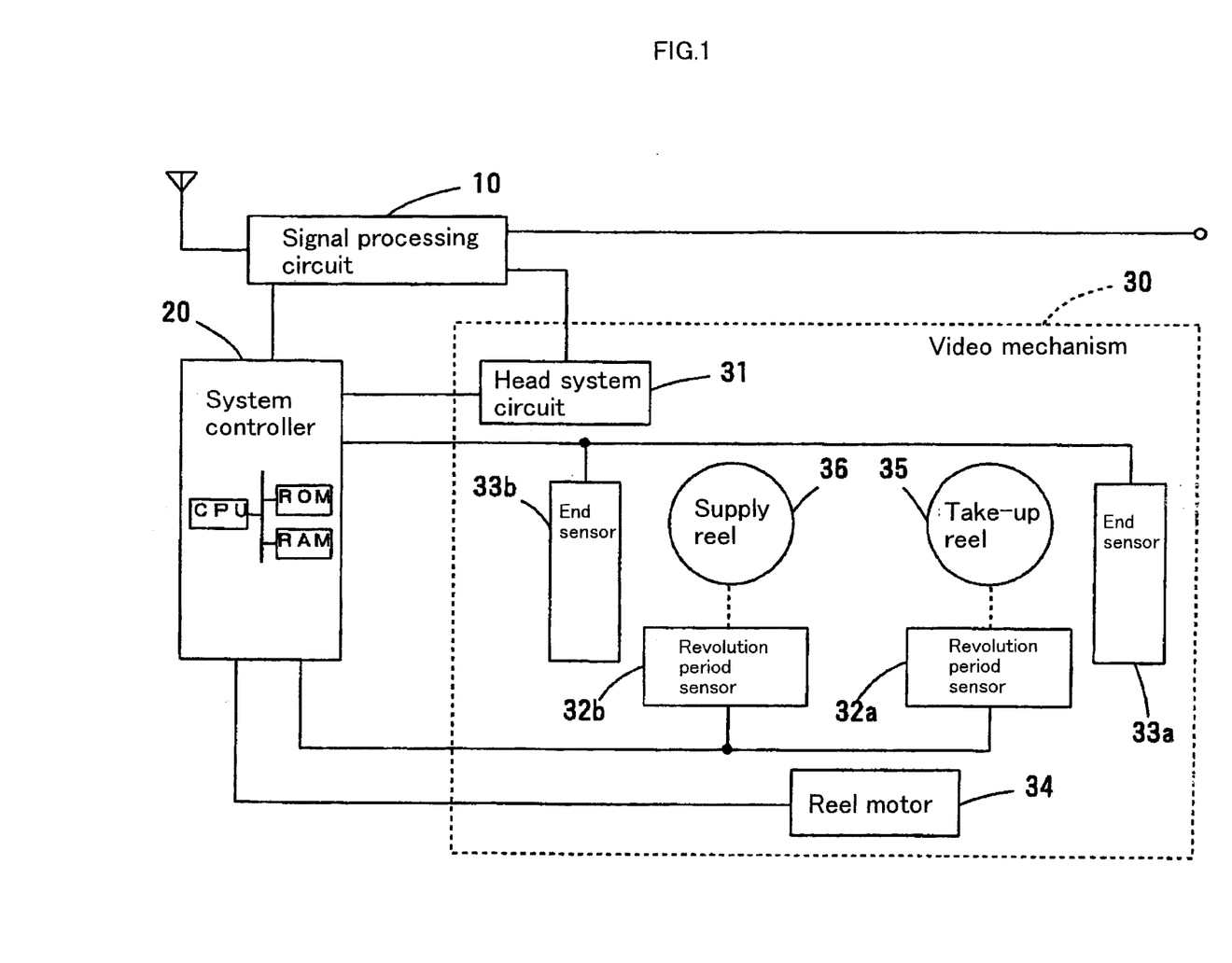
FIG. 1 is a schematic block diagram showing a VHS-format video cassette recorder to which a FF/REW control apparatus according to an embodiment of the present invention is applied.

FIG. 1 is a schematic block diagram showing a VHS-format video cassette recorder to which a FF/REW control apparatus according to an embodiment of the present invention is applied.

In FIG. 1, a signal processing circuit 10 has a tuner, a VIF, an RF converter and the like. In the signal processing circuit 10, a signal for video recording is generated by controlling the VIF and the like in an appropriate order, and a video signal for reproduction is output to a television set (not shown) or the like.

A head system circuit 31, included in a video mechanism 30, has a drum head, an AC head and the like. Upon video recording, a video recording signal generated by the signal processing circuit 10 is output to the head system circuit 31 in the video mechanism 30, and the input video recording signal is recorded on a video tape. Further, upon video reproduction, a video signal is generated from information recorded on a video tape, and the signal is output to the signal processing circuit 10.

Further, the video mechanism 30 has, as circuits to control the running of the video tape, a reel motor 34 which rotates a reel of a video tape, rotational period sensors 32a and 32b which detect rotational periods of a take-up reel 35 and a supply reel 36 for tape running control in FF/REW, and end sensors 33a and 33b which detect the ends of the video tape. Further, the video mechanism 30 has a capstan motor and a servo circuit (both not shown) to control the tape running upon video recording/reproduction.

A system controller 20 has a CPU, a ROM, a RAM and the like. The CPU controls the signal processing circuit 10 and the internal devices in the video mechanism 30 in accordance with a program stored in the ROM. That is, upon video recording, a video tape is forwarded at a predetermined speed under the control of the system controller 20, and at the same time, a signal in a desired channel output from the signal processing circuit 10 is recorded on the video tape by the head system circuit 31. Upon reproduction, the head system circuit 31 detects a signal recorded on a video tape, then, the signal processing circuit 10 performs predetermined processing, and transmits the signal to the television set, thus enabling a user to view a reproduced video image.

Figure 2:
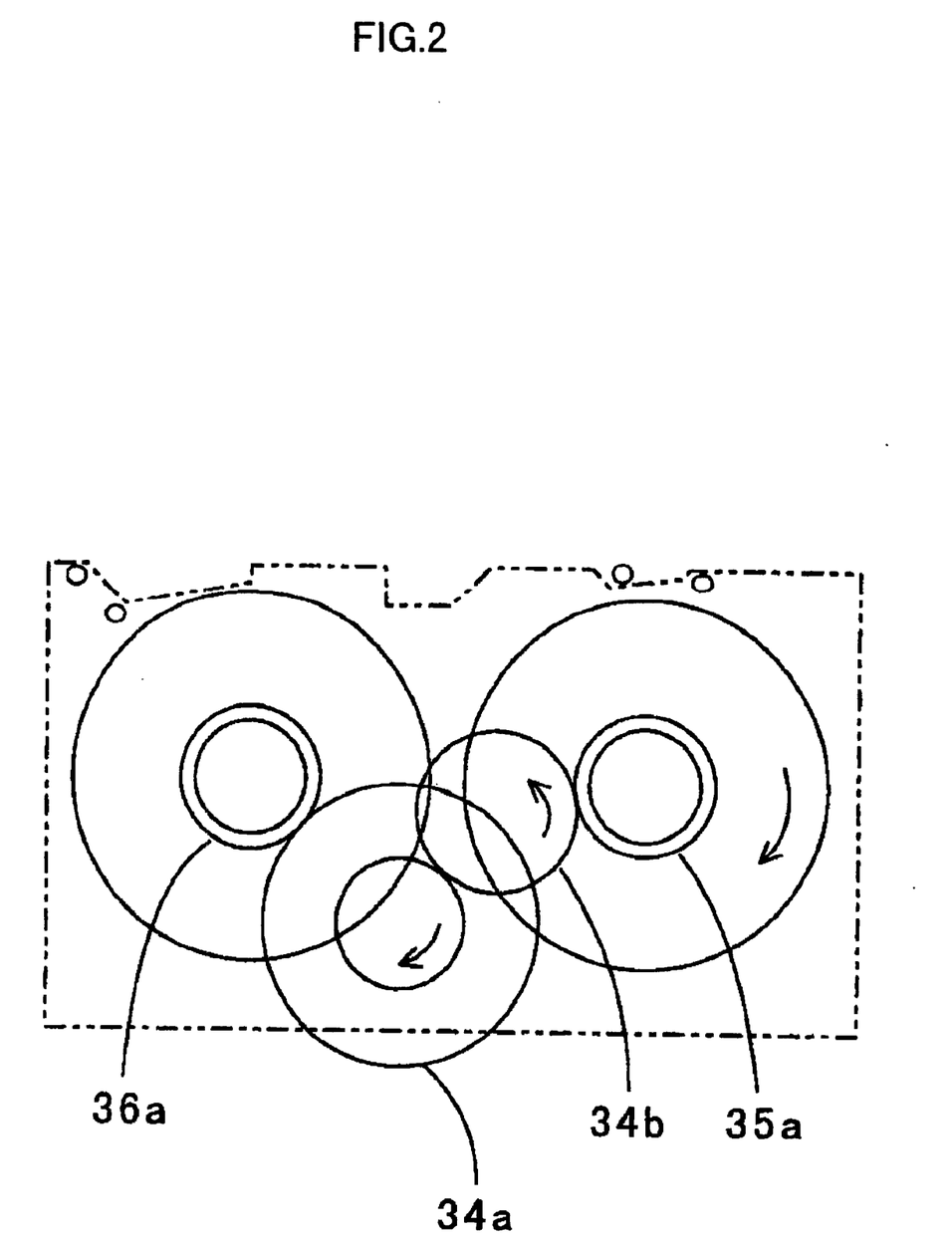
FIG. 2 is a plan view explaining the operation in FF.

Further, the system controller 20 performs FF/REW control while varying the tape speed by controlling the reel motor 34 and the like in the video mechanism 30. That is, the system controller 20 can control the rotational speed and rotational direction of the reel motor 34, and in FF, the system controller 20 drives the reel motor 34 to rotate a clutch pulley 34a in the direction of the arrow shown in the plan view of FIG. 2. Then, FF/REW idler 34b in contact with a periphery of the clutch pulley 34a swingingly moves to the side of the take-up reel table 35a and is then press-attached to a rotational shaft of the table. The idle 34b rotates in the arrow direction, thus rotating the rotational shaft in the arrow direction to forward the tape.

Figure 3:
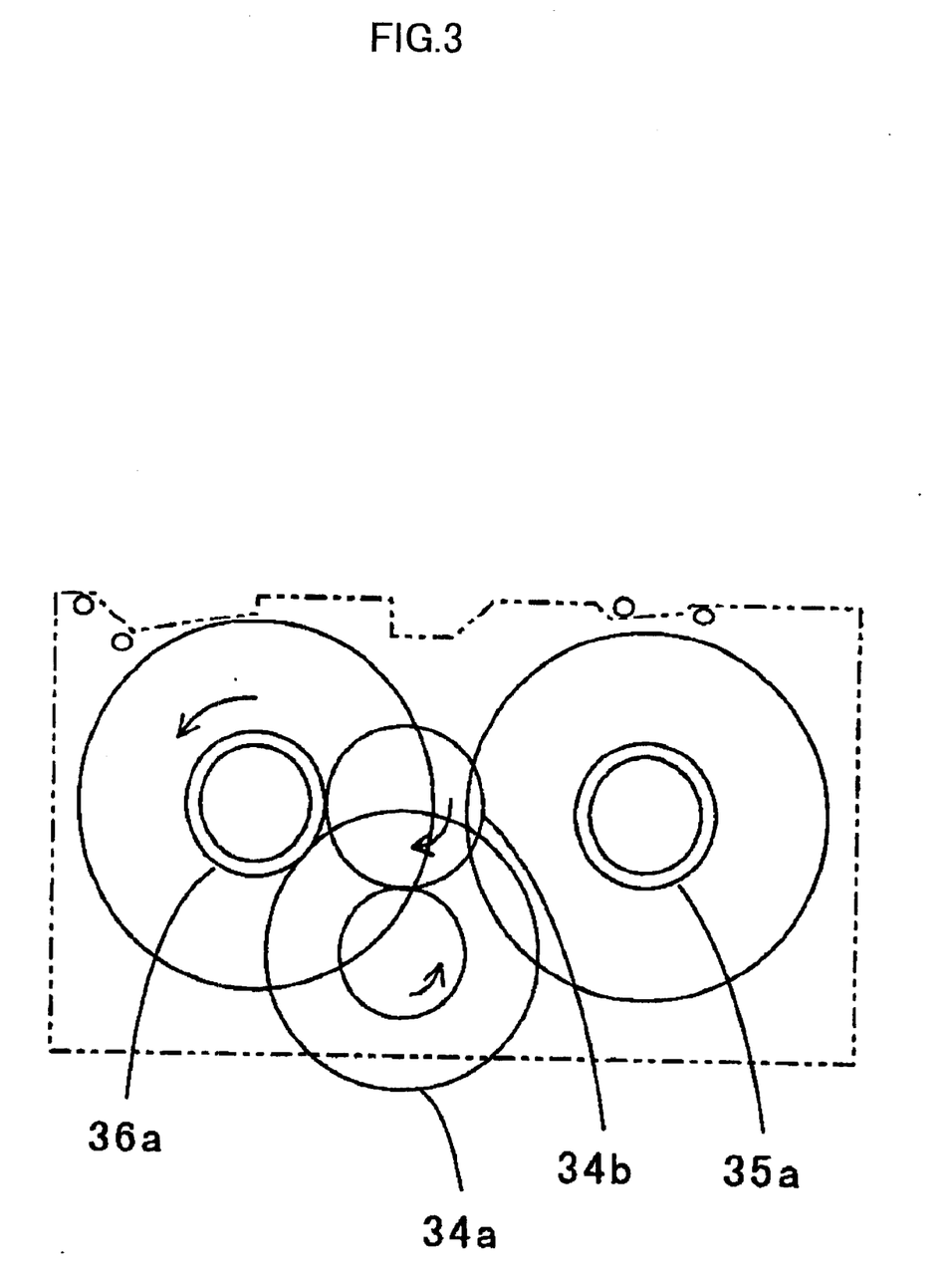
FIG. 3 is a plan view explaining the operation in REW.

On the other hand, in REW, the system controller 20 drives the reel motor 34 in an opposite direction to rotate the clutch pulley 34a in the direction of the arrow shown in the plan view of FIG. 3. Then, the FF/REW idler 34b swingingly moves to the side of the supply reel table 36a and is then press-attached to a rotational shaft of the table. The idler 34b rotates in the arrow direction, thus rotating the rotational shaft in the arrow direction to forward the tape.

The video cassette recorder of the present embodiment can perform so-called high-speed FF/REW. In the high-speed FF/REW, although the tape running speed is different from that in general FF/REW, the basic operation is the same as described above. Next, the control of the tape running speed in the high-speed FF/REW will be described in detail.

Figure 4:
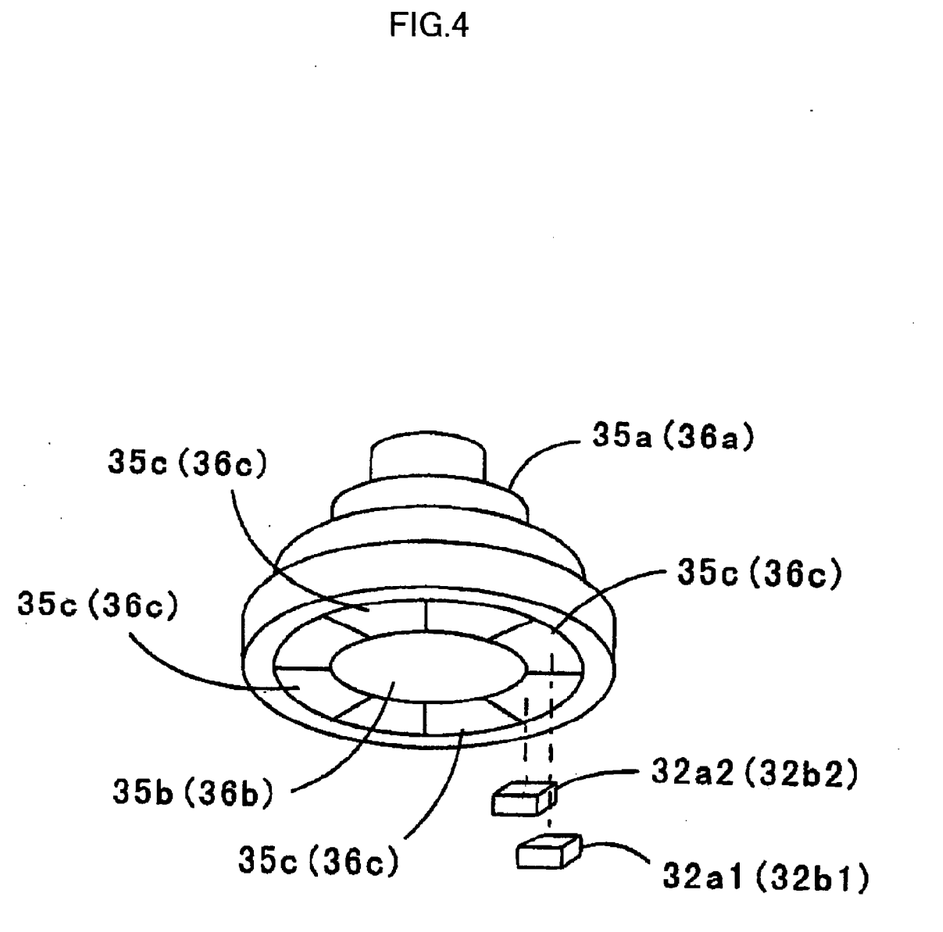
FIG. 4 is a perspective view of a take-up reel table and supply reel table, viewed from a bottom surface side.

As respectively shown in FIG. 4, in the above-described take-up reel table 35a and the supply reel table 36a, respective four reflection plates 35c and 36c having an approximately sector shape are provided at equal intervals in a peripheral direction on the bottom surface side of the rotation shafts 35b and 36b. The rotational period sensors 32a and 3b having phototransistors 32a1 and 32b1 and light-emitting diodes 32a2 and 32b2, respectively, are provided below the respective reflection plates 35c and 36c. The light-emitting diodes 32a2 and 32b2 are directed toward the reflection plates 35c and 36c, and the phototransistors 32a1 and 32b1 detect reflected light from the reflection plates 35c and 36c. As a result, each time the rotational shafts 35b and 36b rotate once, the phototransistors 32a1 and 32b1 output four pulses.

Figure 5:
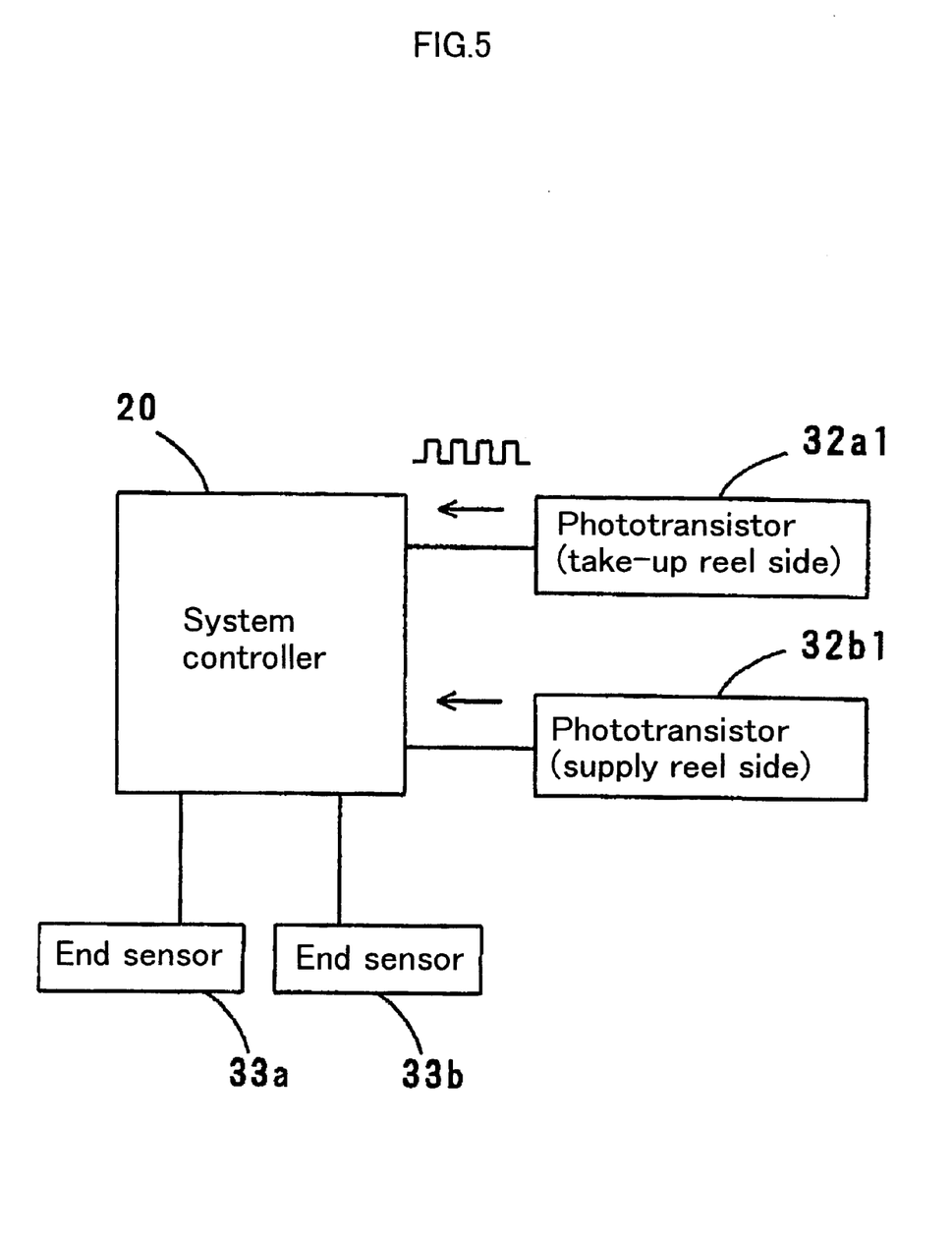
FIG. 5 is a schematic block diagram in which outputs from respective sensors are input into a system controller.

As shown in FIG. 5, the output pulses from the phototransistors 32a1 and 32b1 are input into the system controller 20. The system controller 20 detects the rotational periods of the take-up reel table 35a and the supply reel table 36a and calculates a rotational period ratio between the rotational periods. In this manner, in the present embodiment, the reel motor 34 and the system controller 20 constitute the speed-variable tape-forward mechanism, the take-up reel table 35a and the supply reel table 36a having the phototransistors 32a1 and 32b1 and the like and the system controller 20 constitute the reel rotational-period detection unit, and the system controller 20 constitutes the rotational-period-ratio calculation unit.

Further, although not described above, the video mechanism 30 has end sensors 33a and 33b to detect tape ends, and outputs from the sensors are input into the system controller 20. When high-speed FF/REW is instructed, the system controller 20 detects the instruction, and executes actual high-speed FF/REW processing in accordance with the flowcharts shown in FIGS. 6 to 9. Note that the above rotational period ratio is N, and in FF, the ratio N is defined as a "take-up reel rotational period/supply reel rotational period", while in REW, it is defined as a "supply reel rotational period/take-up reel rotational period".

Figure 6:
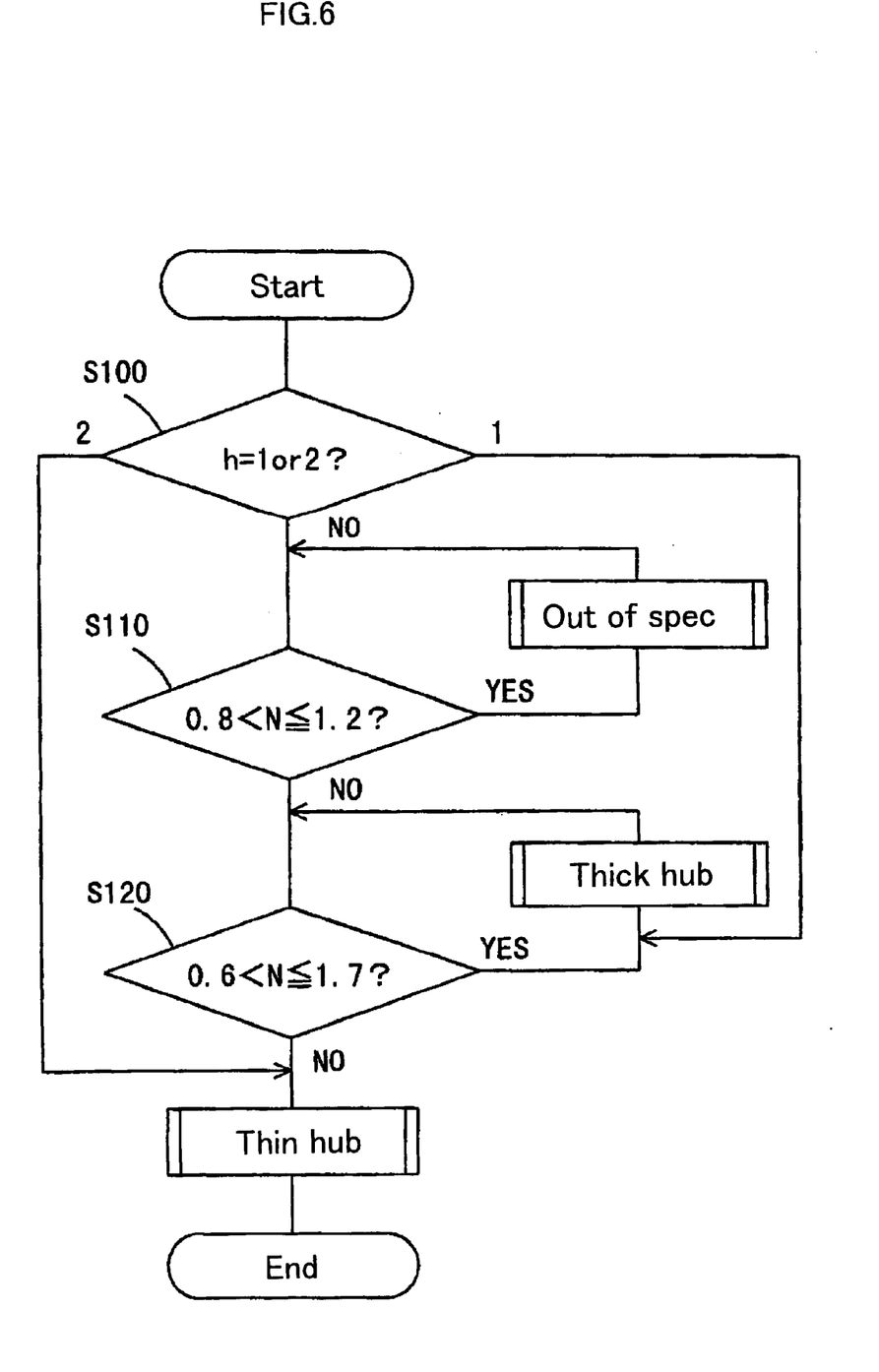
FIG. 6 is a flowchart showing the flow of main control in the present invention.

FIG. 6 is a flowchart showing the flow of main control in the present invention. At step S100, it is determined whether a variable h is "1" or "2" or another numerical value. Note that as described later, the variable h becomes "1" after control for a thick hub is performed once, and becomes "2" after control for a thin hub is performed once. Further, the value of the variable h is maintained until the video tape is ejected.

Accordingly, in a case where FF/REW is stopped once and then the FF/REW is performed again, the control for an out-of-spec hub is not performed after the execution of the control for the thick hub, otherwise, the control for the thick hub or out-of-spec hub is not performed after the execution of the control for thin hub.

If it is determined that the variable h is "1", a subroutine for the thick hub is performed, while if it is determined that the variable h is "2", the control for the thin hub is performed. In a case where the FF/REW is first performed after insertion of the video tape, if the control for the thick hub and the control for the thin hub have not been performed before the current FF/REW, the variable h is neither "1" nor "2". In this case, it is determined at step S110 whether the ratio N stands within a range "0.8<N<1.2".

If it is determined at step S110 that "0.8<N<1.2" holds, then the control for an out-of-spec hub is performed, while if it is determined that "0.8<N<1.2" does not hold, it is determined at step S120 whether the ratio N stands within a range "0.6<N<1.7". If it is determined at step S120 that "0.6<N<1.7" holds, then the control for the thick hub is performed, while if it is determined that "0.6<N<1.7" does not hold, then the control for the thin hub is performed.

Figure 7:
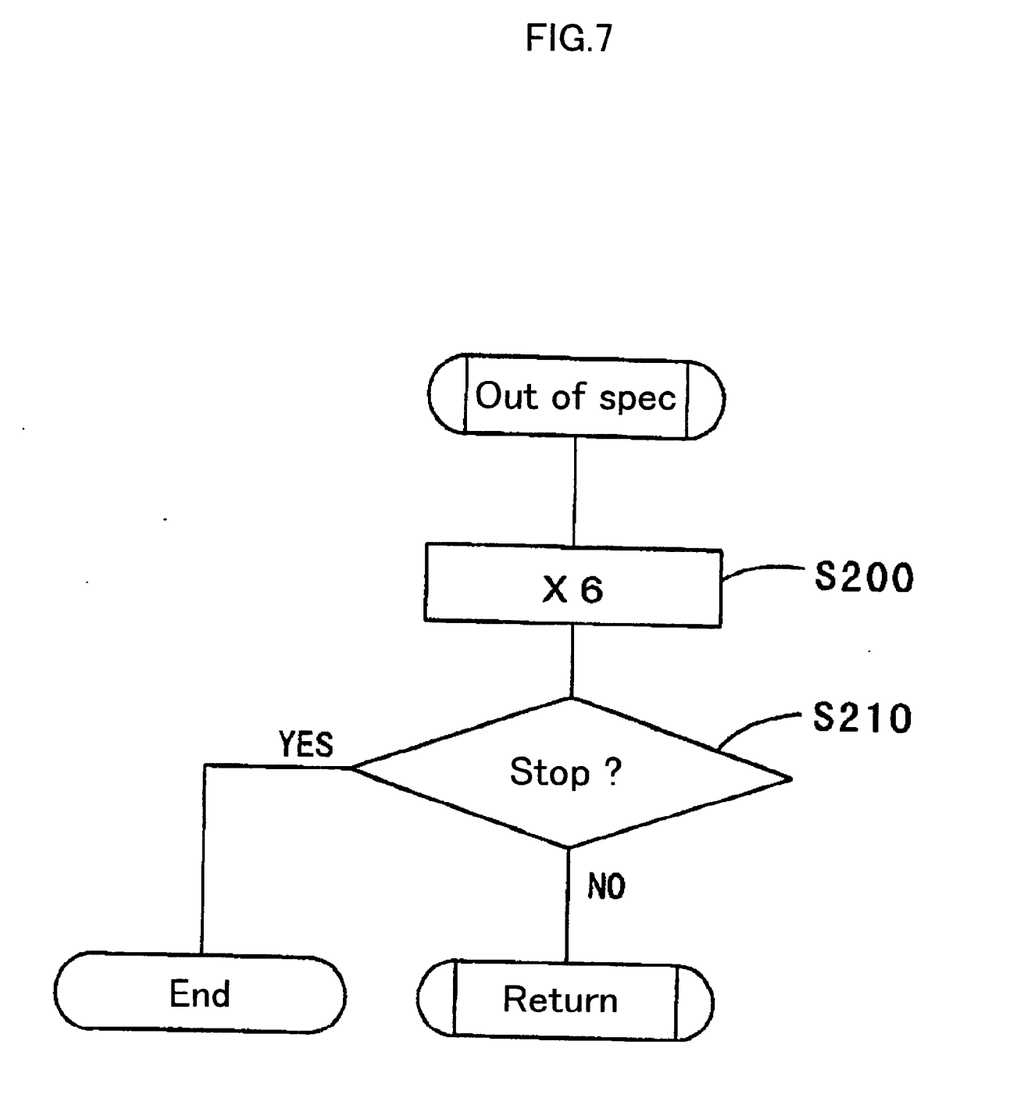
FIG. 7 is a flowchart showing control for an out-of-spec hub.

FIG. 7 is a flowchart showing the control for the out-of-spec hub. In FIG. 7, at step S200, the tape forward is linearly accelerated to a sextuple (6 times) speed. At step S210, it is determined whether or not the user has issued an instruction to stop the FF/REW, or whether or not the end sensors 33a or 33b have detected a tape end such that the FF/REW must be stopped. If it is determined at step S210 that the FF/REW must be stopped, then the tape running is stopped, otherwise, the process returns to step S110 to continue the processing. That is, while "0.8<N<1.2" holds true, the control for the out-of-spec hub is performed.

Figure 8:
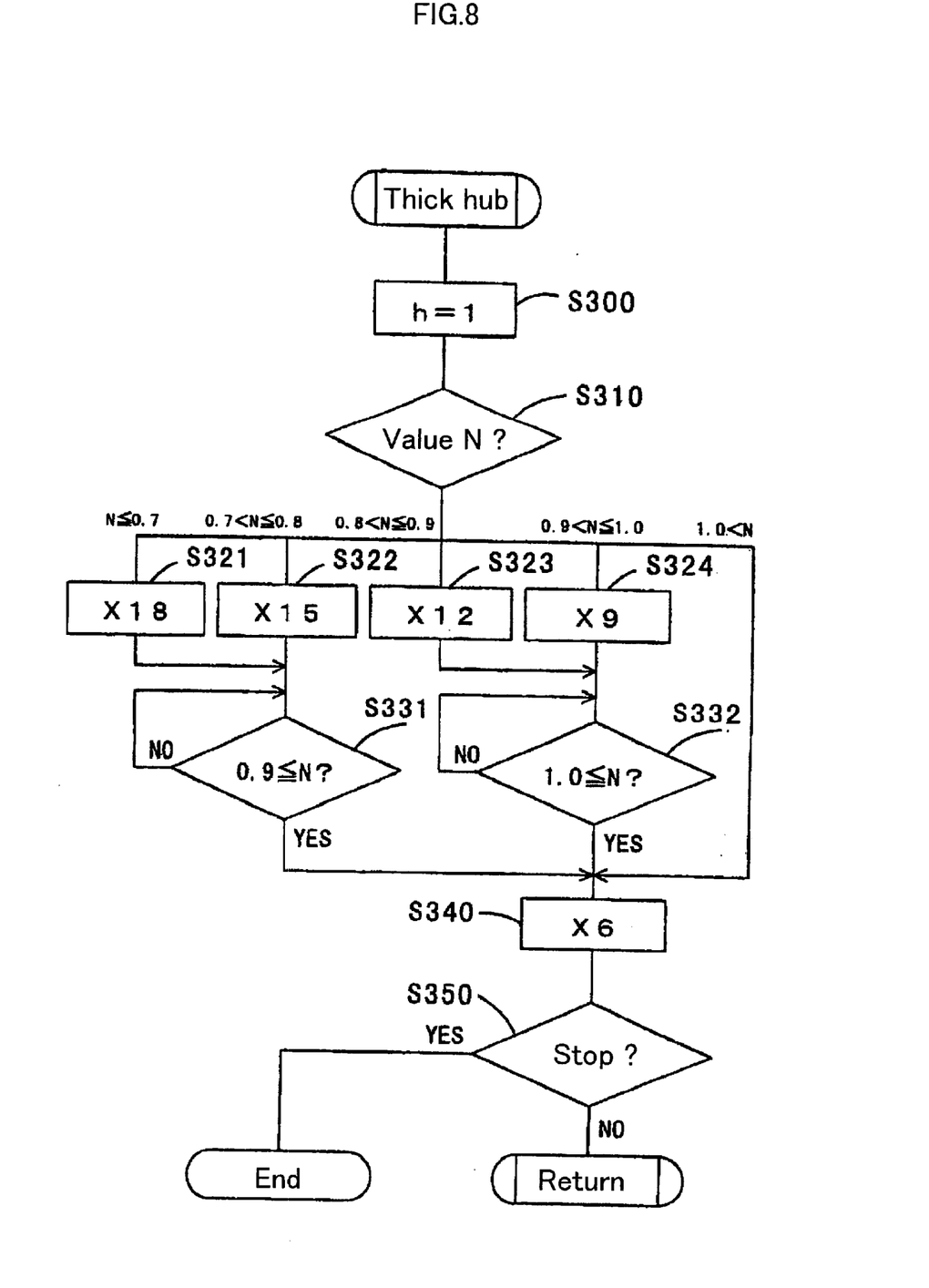
FIG. 8 is a flowchart showing control for a thick hub.

FIG. 8 is a flowchart showing the control for the thick hub. In FIG. 8, at step S300, "1" is assigned to the variable h. Accordingly, if the control for the thick hub in FIG. 8 has been performed once, the control for the out-of-spec hub is not performed by the determination at step S100. At step S310, the value of the ratio N is discriminated, and independent controls are performed based on the threshold values of the ratio N, "N<0.7", "0.7<N<0.8", "0.8<N<0.9", "0.9<N<1.0", and "1.0<N".

If it is determined at step S310 that "N<0.7" holds, then the tape forward is linearly accelerated to a speed 18 times higher at step S321, and if it is determined that "0.7<N<0.8" holds, then the tape forward is linearly accelerated to a speed 15 times higher at step S322. In these cases, it is determined at step S331 whether or not "0.9<N" holds. If it is determined that "0.9<N" holds, then deceleration at step S340 is performed.

If it is determined at step S310 that "0.8<N<0.9" holds, then the tape forward is linearly accelerated to a speed 12 times higher at step S323, and if it is determined that "0.9<N<1.0" holds, the tape forward is linearly accelerated to a speed nine times higher at step S324. In these cases, it is determined at step S332 whether or not "1.0£N" holds. If it is determined that "1.0<N" holds, then the deceleration at step S340 is performed.

At step S340, the tape running speed is varied until the tape running speed becomes the sextuple speed. That is, if it is determined at step S310 that "1.0<N" holds, then the tape forward is accelerated at step S340, then after the above steps S331 and S332, the tape forward is decelerated. At step S350, it is determined whether or not the user has issued an instruction to stop the FF/REW or the end sensor 33a or 33b has detected a tape end such that the FF/REW must be stopped. If it is determined at step S350 that the tape running must be stopped, the tape running is stopped, otherwise, the process returns to step S120 to continue the processing. That is, while "0.6<N<1.7" holds true the control for the thick hub is performed.

Figure 9:
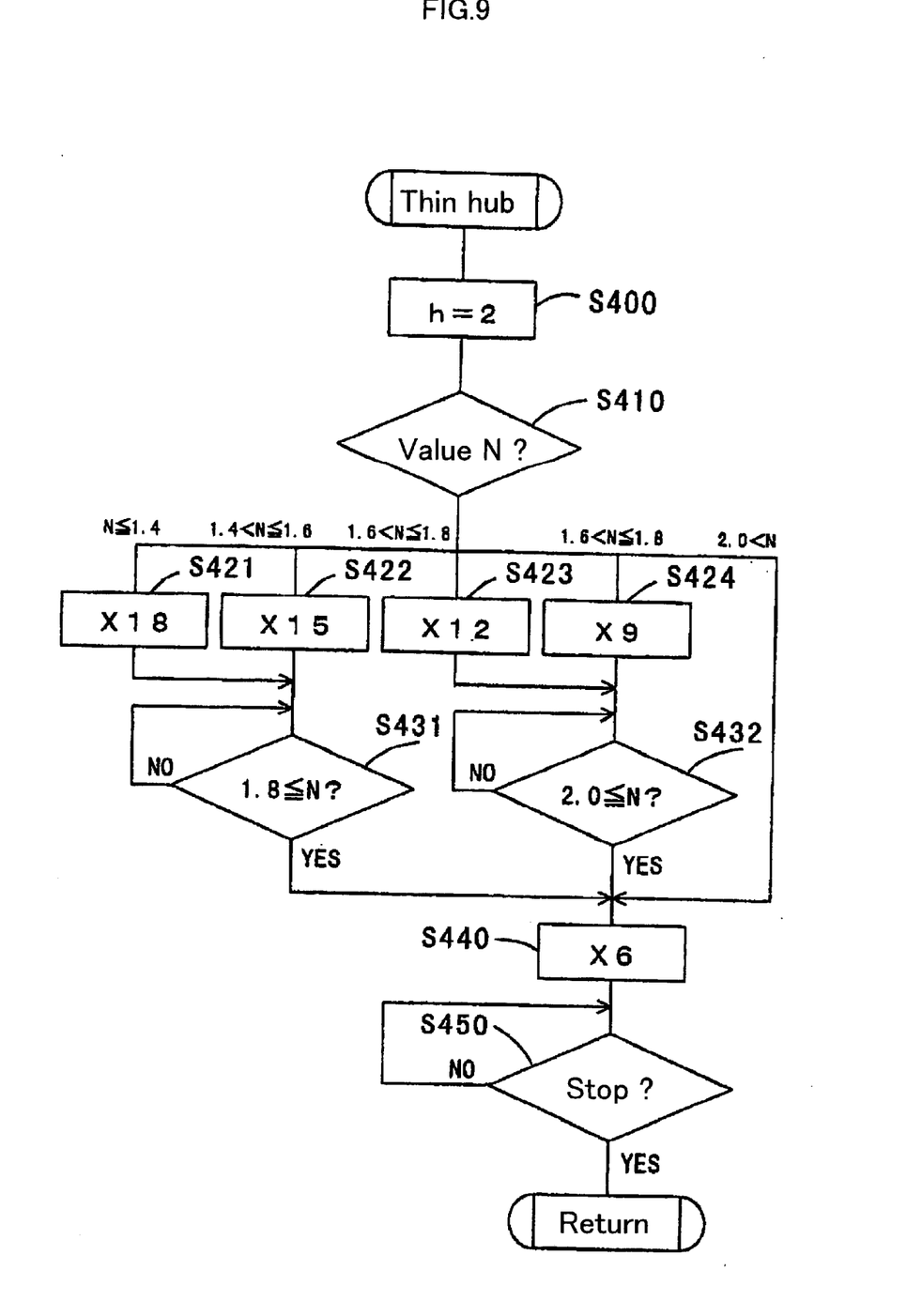
FIG. 9 is a flowchart showing control for a thin hub.

FIG. 9 is a flowchart showing the control for the thin hub. In FIG. 9, at step S400, "2" is assigned to the variable h. Accordingly, if the control for the thin hub in FIG. 9 has been performed once, the control for the out-of-spec hub is not performed by the determination at step S100. At step S410, the value of the ratio N is discriminated, and independent controls are performed based on the threshold values of the ratio N, "N<1.4", "1.4<N<1.6", "1.6<N<1.8", "1.8<N<2.0" and "2.0<N".

If it is determined at step S410 that "N<1.4" holds, then the tape forward is linearly accelerated to a speed 18 times higher at step S421, and if it is determined that "1.4<N<1.6" holds, then the tape forward is accelerated to a speed 15 times higher at step S422. In these cases, it is determined at step S431 whether or not "1.8<N" holds. If it is determined that "1.8<N" holds, deceleration at step S440 is performed.

If it is determined at step S410 that "1.6<N<1.8" holds, then the tape forward is linearly accelerated to a speed 12 times higher at step S423, and if it is determined that "1.8<N<2.0" holds, the tape forward is linearly accelerated to a speed nine times higher at step S424. In these cases, it is determined at step S432 whether or not "2.0<N" holds. If it is determined that "2.0<N" holds, the deceleration at step S440 is performed.

At step S440, the tape running speed is varied until the tape running speed becomes the sextuple speed. That is, if it is determined at step S410 that "2.0<N" holds, the tape forward is accelerated at step S440, then after the above steps S431 and S432, the tape forward is decelerated. Then, it is determined at step S450 whether or not the user has issued an instruction to stop the FF/REW or the end sensor 33a or 33b has detected a tape end such that the FF/REW must be stopped. Then, the tape running is continued until it is determined at step S450 that the tape running must be stopped, then the tape running is stopped. In this manner, the system controller 20 constitutes the tape forward control unit.

Figure 10A:
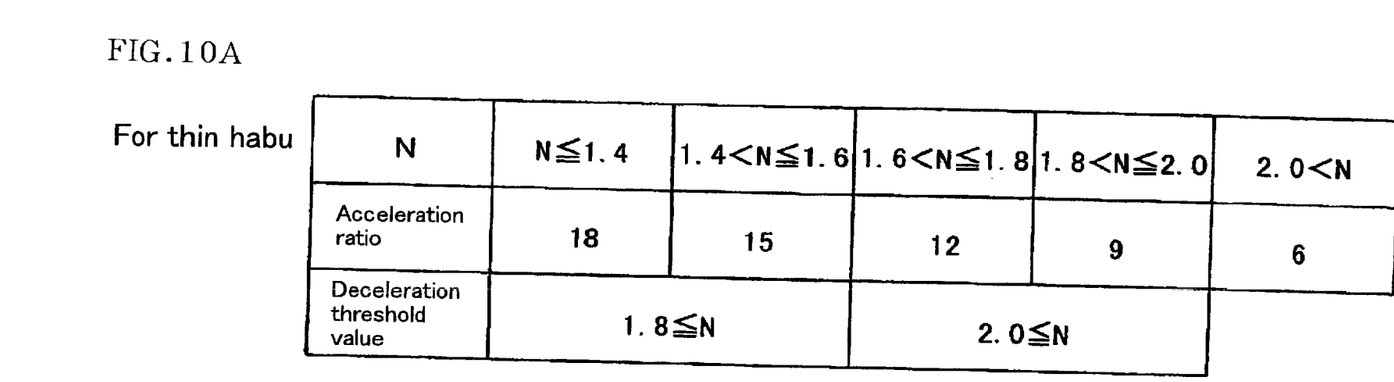
FIGS. 10A and 10B are tables, respectively, showing threshold values of the rotational period ratio N, acceleration ratios, and threshold values of initial values of the rotational period ratio N.
Figure 10B:
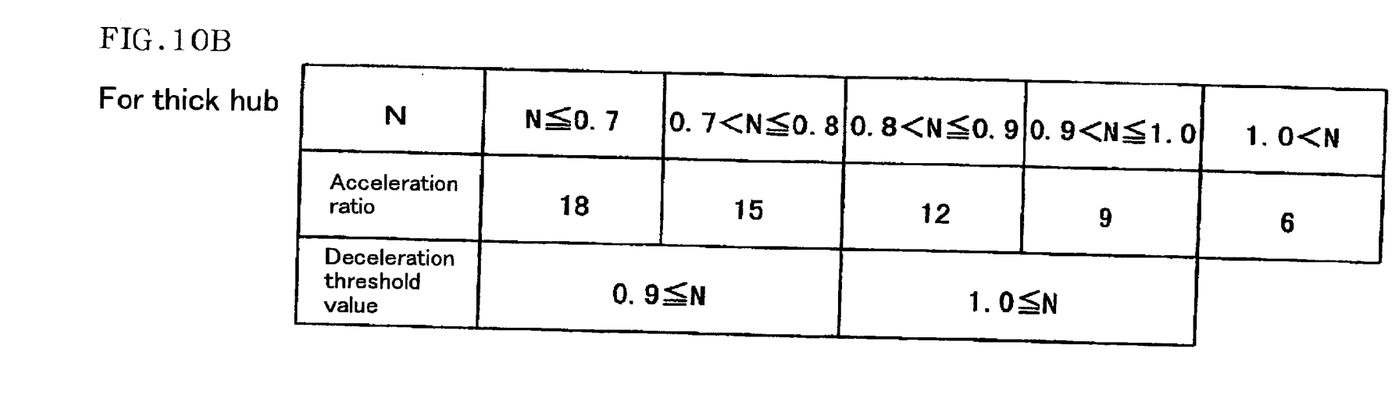

FIGS. 10A and 10B are tables showing the threshold values of the rotational period ratio N and the threshold values of the initial values of the rotational period ratio N, respectively. In FF or REW operation, if the video tape has the thin hub diameter, tape forward is controlled by the threshold values shown in the table in FIG. 10A, while if the video tape has the thick hub diameter, the tape forward is controlled by the threshold values shown in the table in FIG. 10B. Accordingly, the high-speed FF/REW can be controlled by the uniform, simple, determination.

Next, the operation during the high-speed FF/REW in the present embodiment constructed as above will be described.

Figure 11A:
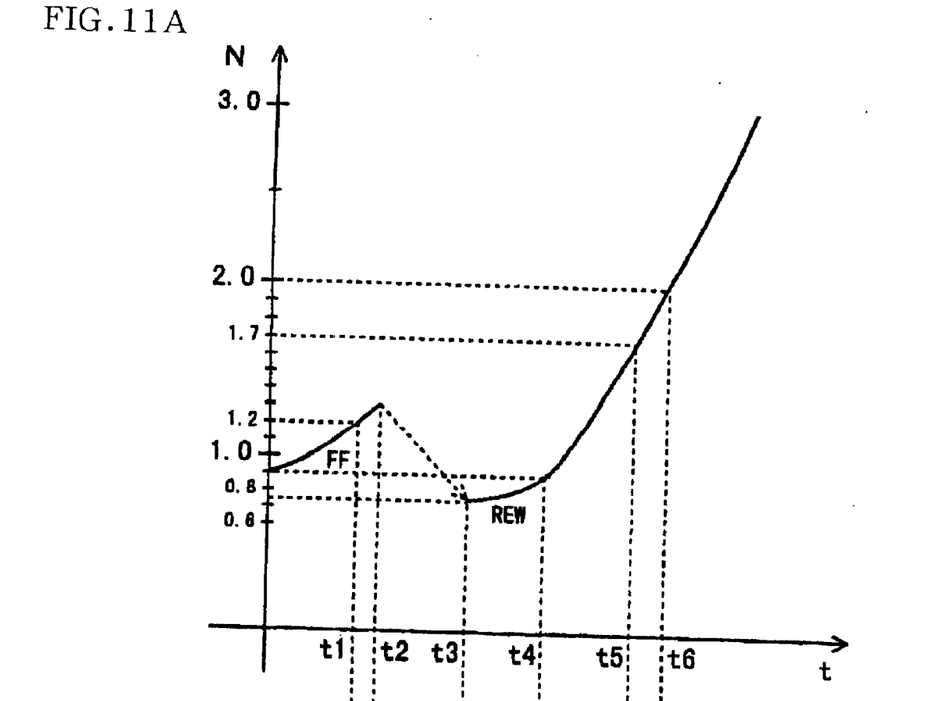
FIGS. 11A and 11B are line graphs showing an example of the time change of the rotational period ratio N and an example of the time change of the acceleration ratio.
Figure 11B:
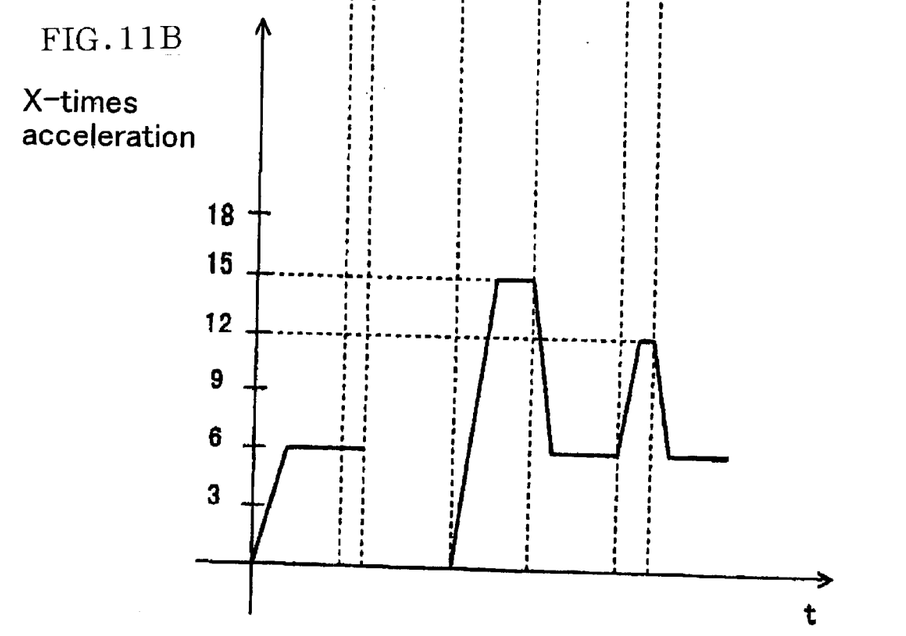

FIG. 11A shows an example of the change in the rotational period ratio N over time, and 11B, shows an example of the change of the acceleration ratio over time. Note that in the example the loaded video tape has a thin hub, and the initial value of the rotational period ratio N is "0.9". Hereinbelow, description is based on an operation in which the user executes the high-speed FF, then stops the high-speed FF, and then executes the high-speed REW.

When the user loads the video tape into the apparatus and executes the high-speed FF, the phototransistors 32a1 and 32b1 of the rotational period sensors 32a and 32b output pulse signals, and the system controller 20 detects the pulse signals and calculates the rotational period ratio N. As the initial value of the rotational period ratio N is "0.9", the control for the out-of-spec hub is performed by the determination at step S120, and the FF is performed while it is accelerated toward a sextuple speed.

When the FF speed equals the sextuple speed, the speed is maintained. As the rotational period ratio N exceeds "1.2" at time t1, the control is shifted to the control for the thick hub by the determination at step S110 and the determination at step S120. At this time, the control for the thick hub in FIG. 8 is performed. Because the rotational period ratio N is over "1.0", the FF speed is still the sextuple speed. Next, the user stops the high-speed FF when the rotational period ratio N is "1.33" at time t2.

Then, if the high-speed REW is started at time t3, since the ratio N is in an inverse relation between FF and REW, the rotational period ratio N is "0.7". Further, since the control has been shifted to the control for the thick hub once, the control for thick hub is performed from the start by the determination at step S100. Further, as the rotational period ratio N is "0.7", the REW is performed while it is accelerated toward a speed 15 times higher by the determination at step S310.

When the REW speed reaches the 15 times higher speed, the speed is maintained. As the rotational period ratio N exceeds "0.9" at time t4, the REW is linearly decelerated toward the sextuple speed at step S340. Then, if the user does not issue an instruction to stop the REW, the sextuple speed is maintained. Note that as the video tape has the thin hub diameter, when the rotational period ratio N exceeds 0.7 at time t5, the control is shifted to the control for the thin hub by the determination at step S120.

In this manner, when the control has been shifted to the control for the thin hub, the REW is linearly accelerated again toward the speed 12 times higher at step S423 by the discrimination of the rotational period ratio N at step S410. Then, the 12 times higher speed is maintained until the rotational period ratio N exceeds "2.0" at time t6, wherein the REW speed is linearly decelerated, and the REW at the sextuple speed is continued until it is determined at step S450 that the REW must be stopped. Note that as the variable h is "2" when the control for the thin hub has been performed once, even if the FF/REW is performed again, the control for the thin hub is performed from the start by the determination at step S100.

As described above, in the present invention, the high-speed tape forward control for the thick hub and the high-speed tape forward control for the thin hub can be performed. The system controller 20 calculates the value N representing the ratio between the rotational period of the take-up reel and that of the supply reel, and when the value of the ratio N is other than values of a thick hub video tape, it performs the high-speed tape forward control for the thin hub. Accordingly, the high-speed mode FF/REW can be performed without requiring direct discrimination of the hub diameter, and without providing software and the like for that purpose. Therefore, a FF/REW control apparatus that performs high-speed FF/REW with a simple control can be provided.

As many apparently widely different embodiments of the present invention can be made without departing from the spirit and scope thereof, it is to be understood that the invention is not limited to the specific embodiments thereof except as defined in the appended claims.

What is claimed is:

1. A FF/REW (Fast Forward/Rewind) control apparatus, comprising:
    a speed-variable tape forward mechanism (34, 20), in which a video tape is loaded, for performing FF (Fast Forward) or REW (Rewind) operations on the video tape while variably controlling a tape running speed;
    a reel rotational-period detection unit (35a, 36a, 32a1, 32b1, 20) for detecting rotational periods of a supply reel and a take-up reel in said speed-variable tape forward mechanism;
    a rotational-period-ratio calculation unit (20) for calculating a rotational period ratio between the rotational periods of the supply reel and the take-up reel detected by said reel rotational-period detection unit; and
    a tape-forward control unit controlling said speed-variable tape forward mechanism for performing high-speed tape forward in a case where a hub diameter of the video tape is a thick hub diameter and in a case where the hub diameter is a thin hub diameter, said tape-forward control unit operating upon a FF/REW request to perform high-speed tape forward control for the case where the hub diameter is the thin hub diameter when the rotational period ratio calculated by said rotational-period-ratio calculation unit has any value that is not within a value range predetermined for a video tape having the thick hub diameter.

2. The FF/REW control apparatus according to claim 1, wherein said tape-forward control unit performs high-speed tape forward control for the case of the thick hub diameter when the rotational period ratio has a value other than values predetermined for a video tape having an out-of-spec hub diameter.

3. The FF/REW control apparatus according to claim 2, wherein said tape-forward control unit determines that the rotational period ratio has a value other than the values of the video tape having the out-of-spec hub diameter if the rotational period ratio is outside a range of 0.8 to 1.2, and determines that the rotational period ratio has a value other than the values of the video tape having the thick hub diameter if the rotational period ratio is outside a range of 0.6 to 1.7.

4. The FF/REW control apparatus according to claim 2, wherein for the high-speed tape forward in both cases of the thick hub diameter and the thin hub diameter, said tape-forward control unit controls the high-speed tape forward so as to accelerate a tape running speed to a higher speed when an initially determined rotational period ratio value decreases, and when the rotational period ratio value becomes greater than a predetermined value, to decelerate the tape running speed.

5. The FF/REW control apparatus according to claim 2, wherein said tape-forward control unit quickly performs high-speed tape forward control in accordance with the rotational period ratio calculated by said rotational-period-ratio calculation unit immediately after starting a FF/REW operation.

6. The FF/REW control apparatus according to claim 3, wherein said tape-forward control unit quickly performs high-speed tape forward control in accordance with the rotational period ratio calculated by said rotational-period-ratio calculation unit immediately after starting a FF/REW operation.

7. The FF/REW control apparatus according to claim 3, wherein for the high-speed tape forward in both cases of the thick hub diameter and the thin hub diameter, said tape-forward control unit controls the high-speed tape forward so as to accelerate a tape running speed to a higher speed when an initially determined rotational period ratio value decreases, and when the rotational period ratio value becomes greater than a predetermined value, to decelerate the tape running speed.

8. The FF/REW control apparatus according to claim 1, wherein for the high-speed tape forward in both cases of the thick hub diameter and the thin hub diameter, said tape-forward control unit controls the high-speed tape forward so as to accelerate a tape running speed to a higher speed when an initially determined rotational period ratio value decreases, and when the rotational period ratio value becomes greater than a predetermined value, to decelerate the tape running speed.

9. The FF/REW control apparatus according to claim 8, wherein said tape-forward control unit quickly performs high-speed tape forward control in accordance with the rotational period ratio calculated by said rotational-period-ratio calculation unit immediately after starting a FF/REW operation.

10. The FF/REW control apparatus according to claim 1, wherein said tape-forward control unit quickly performs high-speed tape forward control in accordance with the rotational period ratio calculated by said rotational-period-ratio calculation unit immediately after starting a FF/REW operation.

11. A FF/REW control apparatus, comprising:

a supply reel and a take-up reel, provided in a position where a video tape is loaded, and being rotatable while engaging with hubs of the video tape;

a reel motor, connectable via an idler to one of said supply reel and said take-up reel, said reel motor speed-variably driving any one of said reels in a predetermined direction;

rotational period sensors that respectively detect rotational speeds of said supply reel and said take-up reel;

end sensors that respectively detect a start end and a terminal end in the video tape; and a system controller, connected to said rotational period sensors, said end sensors and said reel motor, that calculates a rotational period ratio between the rotational speeds of said supply reel and said take-up reel based on result of outputs from said rotational period sensors when high-speed tape forward is performed on the video tape until the start end or the terminal end is detected by said end sensors, and performs high-speed tape forward control for a thick hub if the rotational period ratio has a value within a value range of a video tape having a thick hub diameter, and further performs high-speed tape forward control for a thin hub if the rotational period ratio has any value outside of the value range of the video tape having the thick hub diameter.

12. A FF/REW control method which, upon a FF or REW operation request while varying a tape running speed of a loaded video tape, performs high-speed tape forward in cases where both a hub diameter of the video tape is a thick hub diameter and a thin hub diameter, the method comprising the acts of:

detecting rotational periods of a supply reel and a take-up reel of the video tape;

calculating a rotational period ratio between the detected rotational periods of the supply reel and the take-up reel; and performing high-speed tape forward control in the case where the hub diameter is the thick hub diameter if the calculated rotational period ratio has a value within a value range predetermined for a video tape having the thick hub diameter, and performing high-speed tape forward control in the case where the hub diameter is the thin hub diameter if the rotational period ratio has any value outside of the value range of the video tape having the thick diameter.

13. A computer product comprising a computer readable medium having stored therein a FF/REW control program for performing by a computer, upon request of a FF or REW operation while varying a tape running speed of a loaded video tape, high-speed tape forward for both cases where a hub diameter of the video tape is a thick hub diameter and a thin hub diameter, said program comprising:

detection process procedure code for detecting rotational periods of a supply reel and a take-up reel of the video tape;

calculation process procedure code for calculating a rotational period ratio between the detected rotational periods of the supply reel and the take-up reel; and control process procedure code for performing high-speed tape forward control in the case where the hub diameter is the thick hub diameter if the calculated rotational period ratio has a value within a value range of a video tape having the thick hub diameter, and performing high-speed tape forward control in the case where the hub diameter is the thin hub diameter if the rotational period ratio has any value outside of the value range of the video tape having the thick diameter.

* * * * *